(12) United States Patent  
Kang et al.

(10) Patent No.: US 8,547,500 B2
(45) Date of Patent: Oct. 1, 2013

(54) LIGHT GUIDE PLATES OF LIQUID CRYSTAL DISPLAY DEVICES HAVING A PLURALITY OF FIXATION MEMBERS

(75) Inventors: Choun Sung Kang, Uiwang-si (KR); Ji Geun Nam, Seoul (KR); Jin Taek Choi, Paju-si (KR); Sang Hyun Ahn, Paju-si (KR); Hee Cheoul Kim, Suwon-si (KR); Jong Bum Choi, Paju-si (KR); Seung Soo Yang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 235 days.

(21) Appl. No.: 12/654,413

(22) Filed: Dec. 18, 2009

(65) Prior Publication Data
US 2011/0013110 A1 Jan. 20, 2011

(30) Foreign Application Priority Data

Jul. 14, 2009 (KR) .................. 10-2009-0064023

(51) Int. Cl.
*G02F 1/1333* (2006.01)
*G02F 1/1335* (2006.01)
*F21V 7/04* (2006.01)

(52) U.S. Cl.
USPC ............ 349/62; 349/58; 349/64; 349/65; 362/615; 362/616

(58) Field of Classification Search
USPC ............ 349/58, 62, 64–65; 362/615–616
See application file for complete search history.

(56) References Cited

U.S. PATENT DOCUMENTS

| 5,905,550 | A * | 5/1999 | Ohgami et al. ............. 349/58 |
| 6,222,597 | B1 * | 4/2001 | Muramatsu ............. 349/58 |
| 2006/0221638 | A1 * | 10/2006 | Chew et al. ............. 362/613 |
| 2009/0268122 | A1 * | 10/2009 | Takahashi ............. 349/58 |

* cited by examiner

*Primary Examiner* — Lauren Nguyen
(74) *Attorney, Agent, or Firm* — McKenna Long & Aldridge LLP

(57) ABSTRACT

A backlight unit that includes a plurality of light source packages configured to each include a metal printed-circuit-board (PCB) and light emitting diodes; a plurality of light guide plates disposed parallel to the light source packages, respectively; at least one fixation member formed on an incident surface of each light guide plate corresponding to one side surface of each light guide plate; and a bottom cover configured to include a plurality of fixation holes which are formed to receive and secure the respective fixation members.

18 Claims, 6 Drawing Sheets

LIGHT GUIDE PLATES OF LIQUID CRYSTAL DISPLAY DEVICES HAVING A PLURALITY OF FIXATION MEMBERS

CROSS-REFERENCE TO RELATED APPLICATION

This application claims priority under 35 U.S.C. 119 to Korean Patent Application No. 10-2009-0064023, filed on Jul. 14, 2009, which is hereby incorporated by reference in its entirety.

BACKGROUND OF THE INVENTION

1. Field of the Invention

This disclosure relates to a backlight unit, and more particularly to a backlight unit configured to implement slimness and reduce its manufacturing costs.

2. Description of the Related Art

Cathode ray tubes (CRTs), which are widely used display devices, are mainly used in TVs or monitors for measuring apparatuses or information terminals. However, the heavy weight and large size of the CRTs have been a major hindrance to the manufacturing of small, light electronic products.

To address this matter, LCD devices are gradually being used in a wide range of applications due to their advantages such as lightness, thinness, and low power consumption. Accordingly, LCD devices are being manufactured to have even larger screens, be thinner, and consume less power. Such LCD devices display images by controlling the amount of light transmitted through liquid crystal.

LCD devices are not self-illuminating display devices, unlike CRTs. As such, an LCD device includes a backlight unit provided on the rear surface of an LCD panel. The backlight unit includes a separate light source providing the light necessary to display an image. The backlight unit is classified as either an edge type or a direct type in accordance with the disposition of its light source.

The edge type backlight unit 10 is configured to include a light source 12, a light guide plate 11, a light source housing 13, and optical sheets 15, as shown in FIG. 1A. The light source 12 is disposed at one side of the edge type backlight unit 10. The light guide plate 11 is configured to disperse incident light from the light source 12. The light source housing 13 is configured to guide light emitted from the light source 12 toward the light guide plate 11. The optical sheets 15 are disposed on the light guide plate 11. The edge type backlight unit 10 further includes a reflection sheet 14 disposed under the light guide plate 11. The reflection sheet 14 is configured to reflect light downward-progressing from the light guide plate 11 toward the optical sheets 15.

The edge type backlight unit 10 enables light generated in the light source 12 to enter into the light guide plate 11 and to be converted into two-dimensional light. The converted two-dimensional light is output toward the optical sheets 15. To rectify this, the edge type backlight unit 10 disperses light toward an upper surface (i.e., the rear surface of an LCD panel) using the light guide plate 11, because the light source 12 is disposed at its one edge. Due to this, the edge type backlight unit 10 has lower brightness than that of the direct type backlight unit, and is difficult to use in a large-sized LCD device.

On the other hand, the direct type backlight unit 20 is configured to include a reflection sheet 24, a plurality of light sources 22, a diffusion plate 21, and optical sheet 25, which are placed in a bottom cover 23, as shown in FIG. 1B. The optical sheets 25 are configured to uniformly diffuse light from the light sources 22. To this end, the optical sheets 25 include a diffusion sheet, a prism sheet, a protective sheet, and others which are disposed on the diffusion plate 21. The diffusion plate 21 is configured to contain a dispersing agent. The plurality of light sources 22 are arranged in fixed intervals under the diffusion plate 21. The reflection sheet 24 is disposed under the plurality of light sources 22.

Such a direct type backlight unit 20 causes a brightness difference between the regions in which the light sources 22 are disposed and those in which the light sources 22 are not. In order to minimize this brightness difference, the direct type backlight unit 20 must maintain a sufficient distance between the light sources 22 and the diffusion plate 21. Therefore, it is difficult to develop an LCD device of a size thin enough to meet the desires of customers when using the direct type backlight unit of the related art.

BRIEF SUMMARY OF THE INVENTION

Accordingly, the present embodiments are directed to a backlight unit that substantially obviates one or more of problems due to the limitations and disadvantages of the related art.

An object of the present embodiment is to provide a backlight unit that is configured to implement the slimness of an LCD device.

Another object of the present embodiment is to provide an LCD device with a slimmer configuration.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, a backlight unit includes: a plurality of light source packages configured to each include a metal printed-circuit-board (PCB) and light emitting diodes; a plurality of light guide plates disposed parallel to the light source packages, respectively; at least one fixation member formed on an incident surface of each light guide plate corresponding to one side surface of each light guide plate; and a bottom cover configured to include a plurality of fixation holes which are formed to receive and secure the respective fixation members.

An LCD device according to another aspect of the present embodiment includes: a liquid crystal display panel; a plurality of light source packages disposed under the liquid crystal display panel and configured to each include a metal printed-circuit-board (PCB) and light emitting diodes; a plurality of light guide plates disposed parallel to the light source packages, respectively; at least one fixation member formed on an incident surface of each light guide plate corresponding to one side surface of each light guide plate; and a bottom cover configured to include a plurality of fixation holes which are formed to receive and secure the respective fixation members.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION OF THE EMBODIMENTS

Figure 1A:
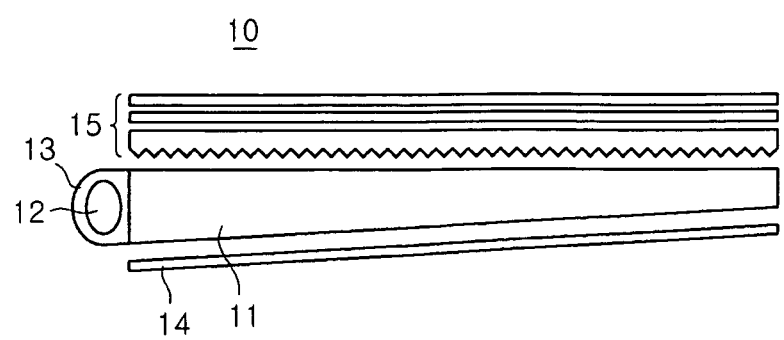
FIG. 1A is a cross-sectional view showing a backlight unit of edge type according to the related art.
Figure 1B:
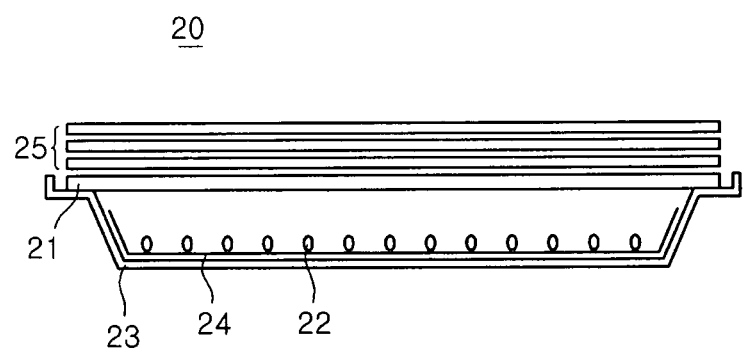
FIG. 1B is a cross-sectional view showing a backlight unit of direct type according to the related art.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
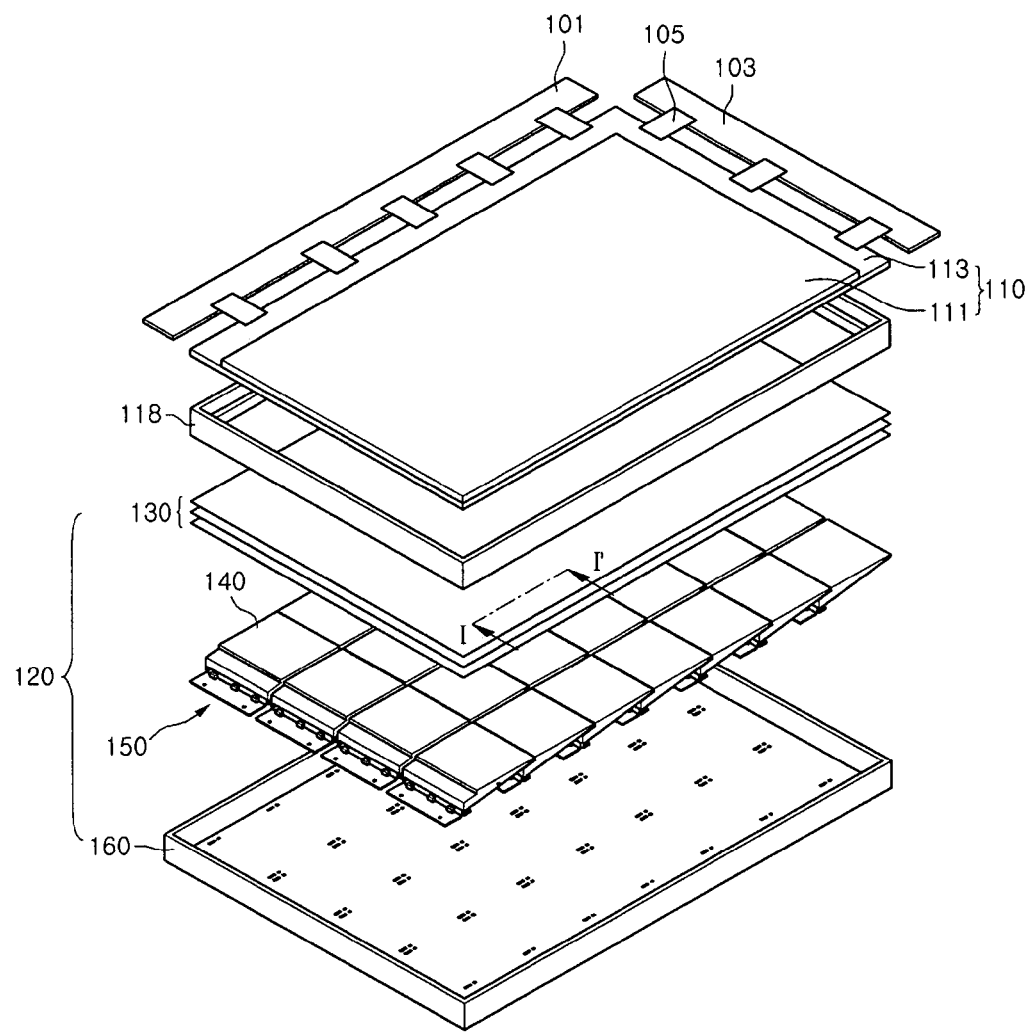
FIG. 2 is a disassembled perspective view showing an LCD device with a direct type backlight unit according to an embodiment of the present disclosure.
Figure 3:
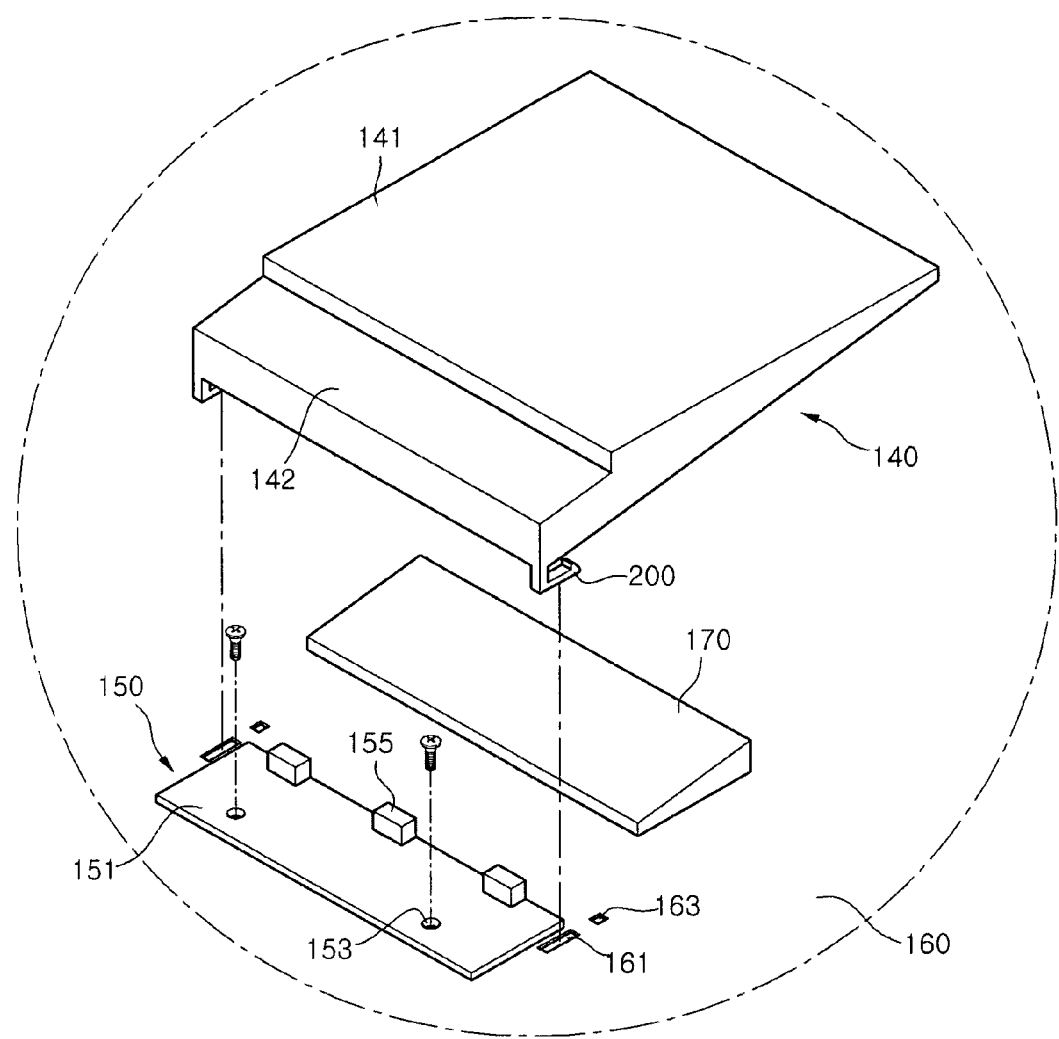
FIG. 3 is a detailed perspective view showing a light source package, a light guide plate, and a bottom cover shown in FIG. 2.
Figure 4:
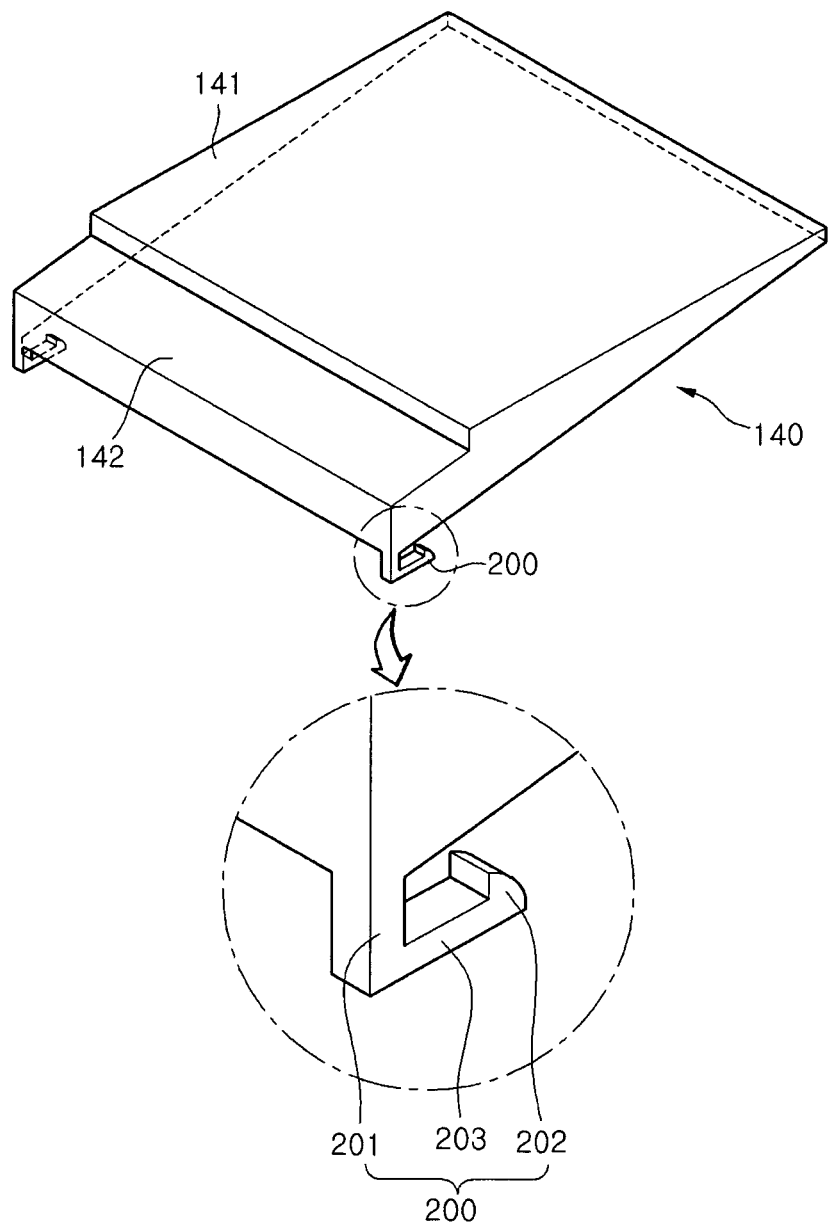
FIG. 4 is a perspective view showing a light guide plate included in a direct type backlight unit according to an embodiment of the present disclosure.
Figure 5:
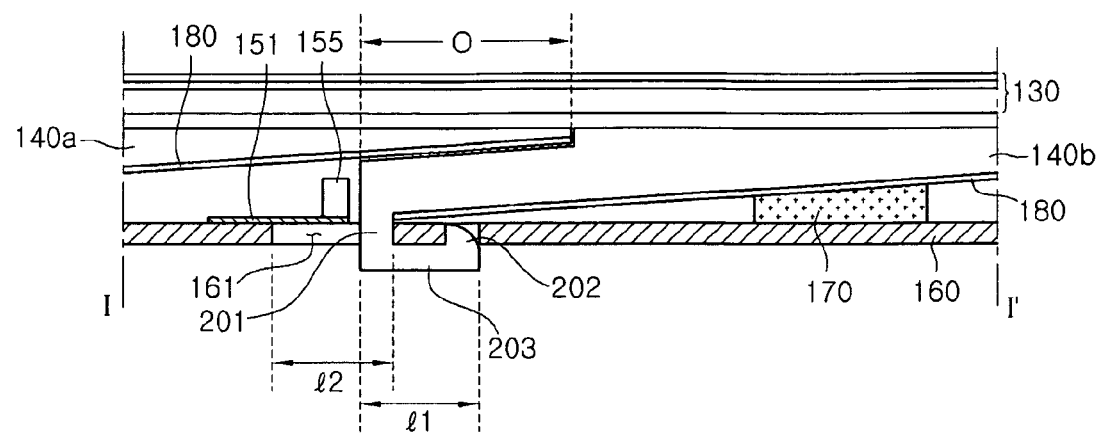
FIG. 5 is a cross-sectional view showing a backlight unit taken along a line I-I' in FIG. 2.

FIG. 2 is a disassembled perspective view showing an LCD device with a direct type backlight unit according to an embodiment of the present disclosure. FIG. 3 is a detailed perspective view showing a light source module, a light guide plate, and a bottom cover shown in FIG. 2, and FIG. 4 is a perspective view showing a light guide plate included in a direct type backlight unit according to an embodiment of the present disclosure. FIG. 5 is a cross-sectional view showing a backlight unit taken along a line I-I' in FIG. 2;

Referring to FIGS. 2 to 4, an LCD device according to an embodiment of the present disclosure includes an LCD panel 110 configured to display images, a backlight unit 120 disposed to apply light to the rear surface of the LCD panel 110, and a panel guider 118 configured to support edges of the rear surface of the LCD panel 110. The panel guider 118 is combined with the backlight unit 120.

Although it is not shown in detail in the drawings, the LCD panel 110 includes a thin film transistor substrate 113 and a color filter substrate 111 disposed opposite each other and combined to maintain a cell gap between them, as well as a liquid crystal layer (not shown) interposed between the substrates 111 and 113. On the thin film transistor substrate 113, a plurality of gate lines are formed, a plurality of data lines are formed to cross the plurality of gate lines, and a plurality of transistors TFT are formed at the intersections of the plurality of gate lines and the plurality of data lines. The color filter substrate 111 includes color filters each formed on their respective pixel.

The LCD device further includes a gate driving PCB (printed circuit board) 103 and a data driving PCB 101 disposed by the sides of the LCD panel 110. The gate driving PCB 103 sequentially applies a scan signal to the gate lines on the LCD panel 110. The data driving PCB 101 applies data signals to the data lines on the LCD panel 110. The gate and data driving PCBs 103 and 101 are electrically connected to the LCD panel 110 by means of COFs (chip on film) 105. The COFs 105 can be replaced with tape carrier packages (TCPs).

The backlight unit 120 is configured to include a box-shaped bottom cover 160 with an opened upper surface, a plurality of light source packages 150 arranged at fixed intervals on the inside of the bottom cover 160, a plurality of light guide plates 140 arranged parallel to the plurality of light source packages 150, and optical sheets 130 disposed on the plurality of light guide plates 140. The plurality of light guide plates 140 are configured to convert spotted incident lights from the respective light source packages 150 into two-dimensional lights. The backlight unit 120 further includes a reflection sheet (180 in FIG. 5) disposed under the plurality of light guide plates 140. The reflection sheet 180 reflects lights progressing downward from the plurality of light guide plates 140 toward the LCD panel 110, thereby reducing the leakage of light.

Each of the plural light source packages 150 and each of the plural light guide plates 140 are combined to form a light source module. The plurality of light source packages 150 and the plurality of light guide plates 140 are arranged parallel to each other along a first direction. The plurality of light guide plates 140 are arranged to partially overlap with one another. As such, the backlight unit 120 of the present embodiment can be divisionally driven by each pair of the light source package 150 and the light guide plate 140 which is disposed to occupy a respectively fixed area on the bottom cover 160. To rectify this, the backlight unit 120 makes it possible to drive the light source modules, which are configured to each include one light source package 150 and one light guide plate 140, in divided areas. Accordingly, the backlight unit 120 of the present embodiment can be applied to a field-sequential LCD device.

The light source package 150 is configured to include a metal PCB 151 with wiring formed thereon, and a plurality of light emission diodes 155 mounted on an upper surface of the metal PCB 151. More specifically, the plurality of light emission diodes 155 are arranged along one edge of the upper surface of the metal PCB 151. Also, a plurality of screw holes 153 are formed on the metal PCB 151 and enable the metal PCB 151 to be fastened to the bottom cover 160 by means of screws. The metal PCB 151 is mounted so as to not overlap with the respective light guide plate 140 on the bottom cover 160 (referring to FIG. 5), but the backlight unit 120 of the present embodiment is not limited to this. In other words, the metal PCB 151 can be mounted to partially overlap with the light guide plate 140 on the bottom cover 160.

Each of the light guide plates 140 is made of poly methyl methacrylate (PMMA) in a wedge shape. In other words, the light guide plate 140 is formed to be thinner the further away it goes from the incident surface opposite to the respective light source package 150.

The backlight unit 120 further includes support members (170 in FIG. 5) disposed under the respective light guide plates 140. These support members (170 in FIG. 5) are configured to prevent the movement of the respective light guide plates 140 which each have the inclined lower surface. As such, an upper surface of each support member (170 in FIG. 5) is formed to have the same gradient as the inclined lower surface of the light guide plate 140.

The upper surface of each light guide plate 140 is formed to have a cross-sectional surface. In other words, the upper surface of each light guide plate 140 can be divided into stepped first and second areas 141 and 142. The first and second areas 141 and 142 are formed to have different inclined surfaces in the center of the cross-sectional surface. One side surface of each light guide plate 140 opposite to the respective light source package 150 is defined as an incident surface which is used to receive light from the respective light source package 150.

Also, the backlight unit 120 is configured to include at least one fixation member 200 which is provided to the incident surface side of each light guide plate 140 and used for fastening the respective light guide plate 140 to the bottom cover 160. The fixation member 200 is formed in a hook structure that is easier to secure to the bottom cover 160. The fixation member 200 can be formed in a single body united with the respective light guide plate 140. Also, two fixation members 200 can be provided for every light guide plate 140. In this case, the two fixation members 200 are engaged with the bottom cover 160 by sequentially passing through first and second fixation holes which are formed to separate at a fixed interval from each other on each of adjacent regions of the bottom cover 160 to both side ends of the respective light source package 150.

Such a fixation members 200 can include a protrusion 201 configured to protrude downwardly from the light guide plate 140, a latch 202 used for securing to the bottom cover 160, and a connection portion 203 configured to connect the protrusion 201 with the latch 203. The connection portion 203 extends from the protrusion 201 along the longitude direction of the light guide plate 140. More specifically, the connection portion 203 is formed to extend from the end of the protrusion 201 toward the other surface of the light guide plate opposite to the incident surface. The latch 202 is configured to protrude from one end of the connection portion 203 toward an upper direction of the light guide plate 140. As such, the fixation member 200 forces the latch 202 to be inserted into the second fixation hole 163 via the first fixation hole 161, so that the light guide plate 140 is secured to the bottom cover 160.

An assembled configuration of the light guide plate 140, the fixation member 200, and the bottom cover 160 will now be explained in detail referring to FIG. 5.

As shown in FIG. 5, a first light guide plate 140a is disposed to partially overlap with a second light guide plate 140b which is previously disposed. The overlapped portion (or the overlapped area) "O" of the first and second light guide plates 140b and 140a can enhance the uniformity of light. In other words, the overlapped portion (or the overlapped area) "O" is provided to prevent a brightness deviation between the areas of the light guide plates 140 adjacent to and remote from the light emission diodes 155.

The length l1 of the connection portion 203 is formed to be equal to or less in length than that l2 of the first fixation hole 161 on the bottom cover 160. As such, the combination of the fixation member 200 with the bottom cover 160 can become much easier, and furthermore the light guide plate 140 can be more stably secured to the bottom cover 160. The connection portion 203 comes in contact with the lower surface of the bottom cover 160, and the latch 202 also comes in contact with the inner surface of the second fixation hole 163.

As described above, the LCD device with a direct type backlight unit 120 according to an embodiment of the present disclosure is configured in a plurality of pairs which each consist of one light source package 150 and one light guide plate 140 and each occupy a divided area. As such, the backlight unit 120 can be driven by areas.

Also, the backlight unit 120 configured to include at least one fixation member 200 which is formed in a single body united with one sidewall side of each light guide plate 140 in order to fasten the respective light guide plate 140 to the bottom cover 160 without additional fixing elements such as screws. Therefore, the LCD device as well as the backlight unit 120 can cut down the manufacturing costs. Moreover, the backlight unit 120 of the present embodiment and the LCD device with the same can become much easier to make slim in comparison with those of the related art.

Figure 6:
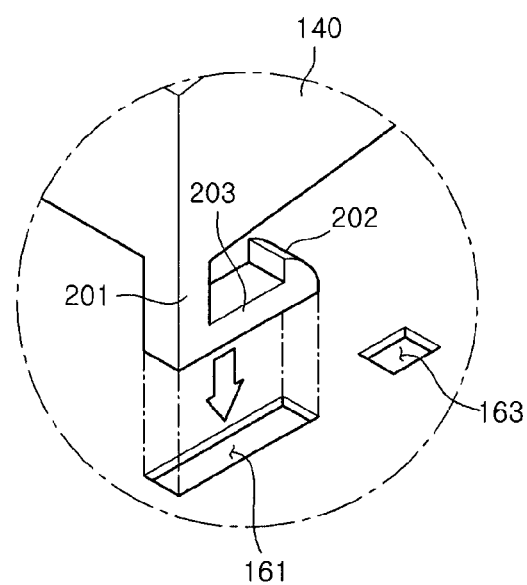
FIGS. 6 to 8 are perspective views explaining a process of combining a light guide plate and a bottom cover which are included in a backlight unit according to an embodiment of the present disclosure.
Figure 7:
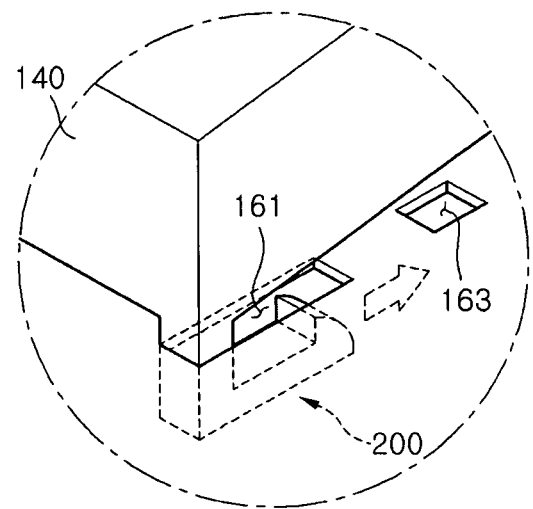
Figure 8:
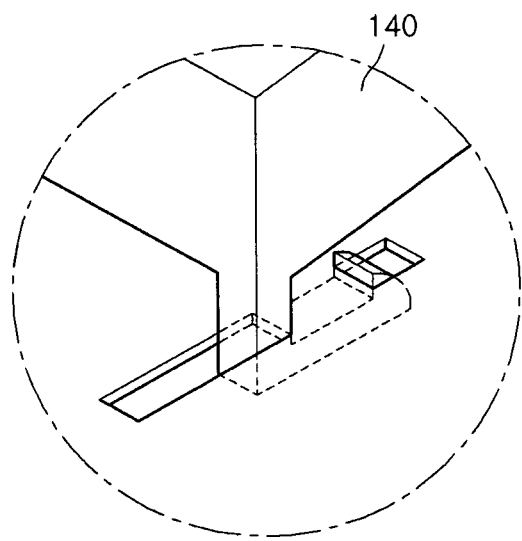

FIGS. 6 to 8 are perspective views explaining a process of combining a light guide plate and a bottom cover which are included in a backlight unit according to an embodiment of the present disclosure.

The fixation member 200 is inserted into the first fixation hole 161 along an arrow direction (a downward direction) "↓" shown in FIG. 6. Then, the fixation member 200 is moved along another arrow direction (i.e., the longitude direction of the light guide plate 140) "→" shown in FIG. 7. Thereafter, the latch 202 of the fixation member 200 is inserted into the second fixation hole 163, as shown in FIG. 8. As such, the light guide plate 140 is secured to the bottom cover 160. In other words, all of the protrusion 201, the latch 202, and the connection portion 203 are inserted into the first fixation hole 161 and then the latch 202 is inserted into the second fixation hole 163, thereby fastening the light guide plate 140 to the bottom cover 160.

In this manner, the backlight unit 120 according to an embodiment of the present disclosure is configured so that the fixation member each formed at both ends of one side surface of the light guide plate 140 is secured by being inserted into the first and second fixation holes 161 and 163 on the bottom cover 160 without using additional elements such as screws. Accordingly, the manufacturing costs of the LCD device as well as the backlight unit 120 can be reduced.

As an example, it is explained that the fixation member is formed with at least one on a side surface of the light guide plate 140, the backlight unit 120 of the present embodiment is not limited this. In other words, a plurality of fixation members 200 can be formed at fixed intervals on one side surface of the light guide plate 140.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

What is claimed is:
1. A backlight unit comprising:
   a plurality of light source packages configured to each include a metal printed-circuit-board (PCB) and a plurality of light emitting diodes;
   a plurality of light guide plates disposed to receive light from a light source package of the plurality of light source packages onto an incident surface, respectively;

a fixation member formed on the incident surface of each light guide plate of the plurality of light guide plates, the incident surface corresponding to one side surface of each light guide plate; and a bottom cover configured to include a plurality of fixation holes which are formed to receive and secure the respective fixation member;

wherein the fixation member is formed on an edge of the incident surface, wherein the fixation member is formed to extend from the incident surface, wherein the fixation member includes a protrusion formed to protrude outwardly from a lower surface, a connection portion formed perpendicular to the protrusion, and a latch formed perpendicular to the connection portion, and wherein the connection portion is configured to connect the protrusion with the latch.

2. The backlight unit claimed as claim 1, wherein the plurality of fixation holes include first fixation holes configured to receive the respective fixation member and second fixation holes configured to receive the respective latch.

3. The backlight unit claimed as claim 1, wherein the connection portion is formed to extend toward another side surface of the light guide plate.

4. The backlight unit claimed as claim 1, wherein the latch is formed to protrude toward an upper direction of the light guide plate.

5. The backlight unit claimed as claim 1, wherein the connection portion is in face-to-face contact with a lower surface of the bottom cover.

6. The backlight unit claimed as claim 2, wherein the latch is in contact with an inner surface of the second fixation hole on the bottom cover.

7. The backlight unit claimed as claim 2, wherein the first fixation hole is formed to have a length that is any one of equal to and larger than that of the connection portion.

8. The backlight unit claimed as claim 1, wherein the plurality of light guide plates are arranged to partially overlap with one another.

9. The backlight unit claimed as claim 1, wherein at least one fixation member includes two fixation members formed at both ends of the incident surface of each light guide plate.

10. The backlight unit claimed as claim 1, wherein an upper surface of the light guide plate is formed to include a cross-sectional surface.

11. The backlight unit claimed as claim 10, wherein the upper surface of the light guide plate is divided into first and second areas formed in different gradients in the center of the cross-sectional surface.

12. A liquid crystal display device comprising:
a liquid crystal display panel;
a plurality of light source packages disposed behind the liquid crystal display panel and configured to each include a metal printed-circuit-board (PCB) and a plurality of light emitting diodes;

a plurality of light guide plates disposed to receive light from a light source package of the plurality of light source packages onto an incident surface and to apply light to the rear surface of the liquid crystal display panel, respectively;

a fixation member formed on the incident surface of each light guide plate of the plurality of light guide plates, the incident surface corresponding to one side surface of each light guide plate; and a bottom cover configured to include a plurality of fixation holes which are formed to receive and secure the respective fixation member;

wherein the fixation member is formed on an edge of the incident surface, wherein the fixation member is formed to extend from the incident surface, wherein the fixation member includes a protrusion formed to protrude outwardly from a lower surface, a connection portion formed perpendicular to the protrusion, and a latch formed perpendicular to the connection portion, and wherein the connection portion is configured to connect the protrusion with the latch.

13. The liquid crystal display device claimed as claim 12, wherein the plurality of fixation holes include first fixation holes configured to receive the respective fixation member and second fixation holes configured to receive the respective latch.

14. The liquid crystal display device claimed as claim 12, wherein the connection portion is formed to extend toward another side surface of the light guide plate.

15. The liquid crystal display device claimed as claim 12, wherein the latch is formed to protrude toward an upper direction of the light guide plate.

16. The liquid crystal display device claimed as claim 12, wherein the connection portion is in face-to-face contact with a lower surface of the bottom cover.

17. The liquid crystal display device claimed as claim 13, wherein the latch is in contact with an inner surface of the second fixation hole on the bottom cover.

18. The liquid crystal display device claimed as claim 12, wherein an upper surface of the light guide plate is formed to include a cross-sectional surface and the upper surface of the light guide plate is divided into first and second areas formed in different gradients in the center of the cross-sectional surface.

* * * * *